Nov. 1, 1966
G. M. KIRKPATRICK
3,283,323
AUTOMATIC GAIN CONTROL RATIO CIRCUIT
Filed Oct. 1, 1957
2 Sheets-Sheet 1
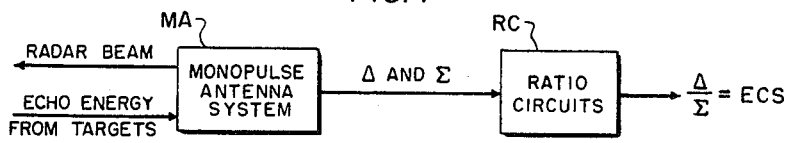
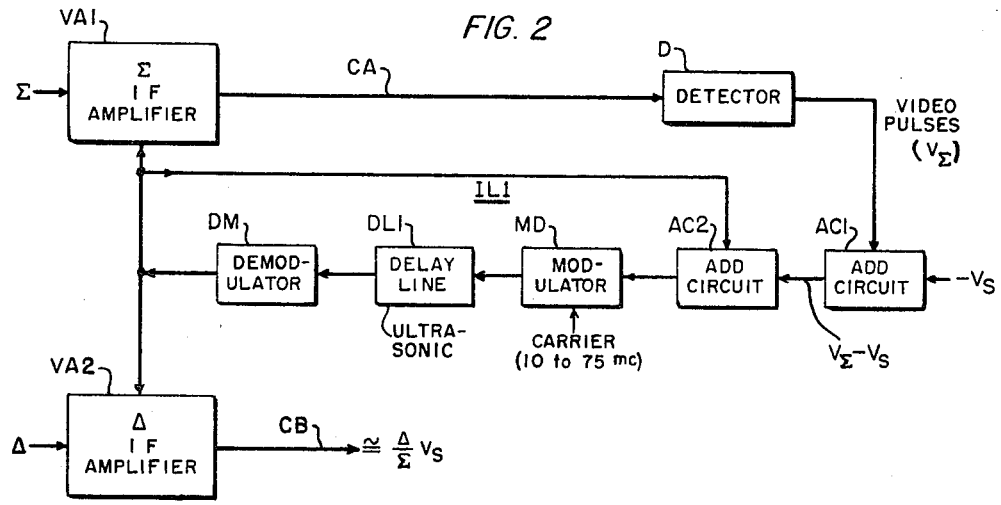
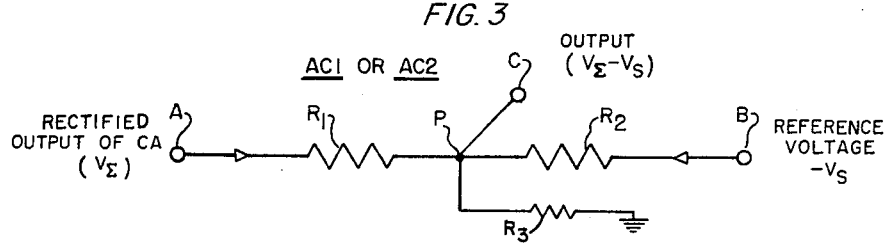
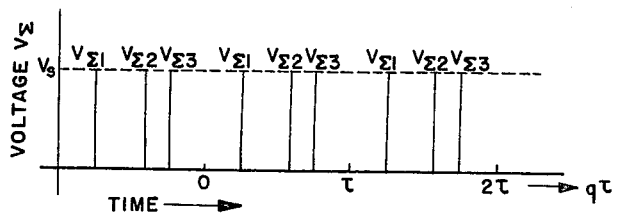
INVENTOR,
GEORGE M. KIRKPATRICK.
BY
Harry M. Saragovitz
ATTORNEY.

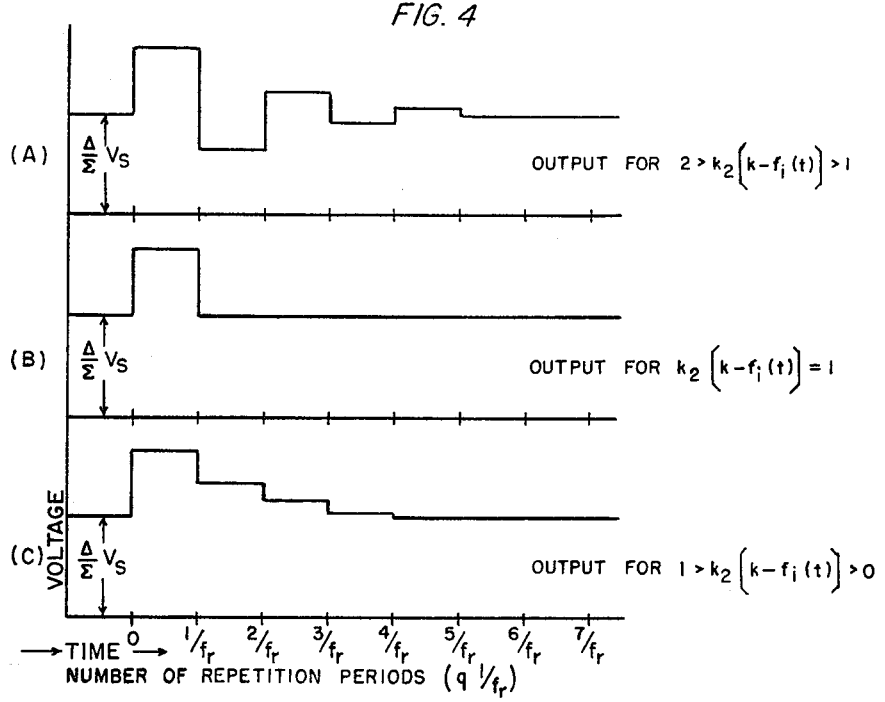
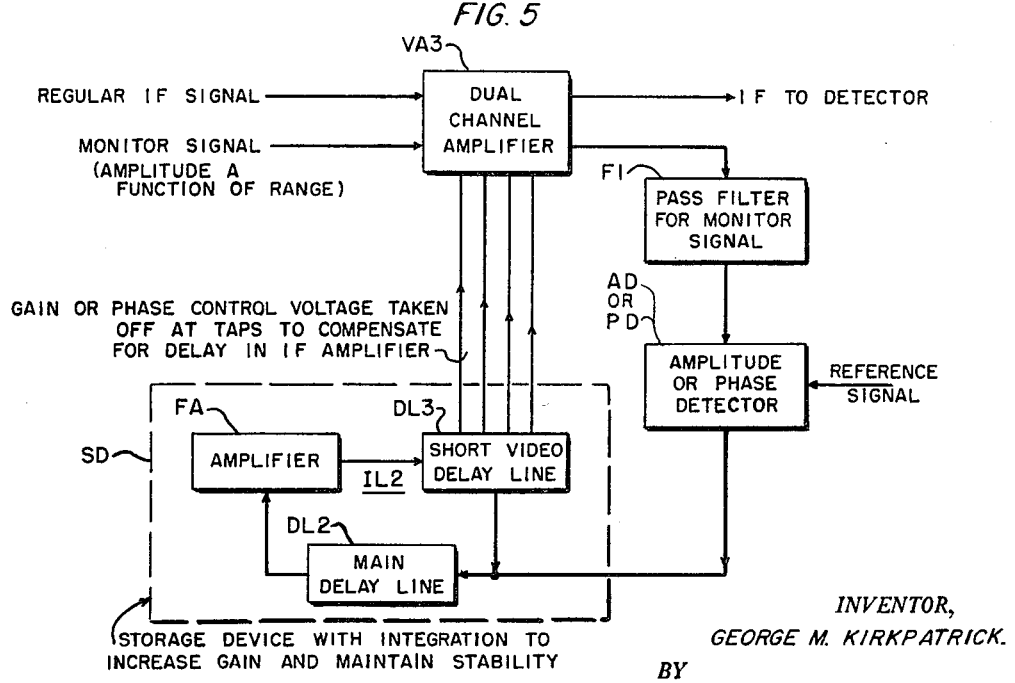

United States Patent Office

3,283,323
AUTOMATIC GAIN CONTROL RATIO CIRCUIT
George M. Kirkpatrick, North Syracuse, N.Y., assignor to the United States of America as represented by the Secretary of the Army
Filed Oct. 1, 1957, Ser. No. 688,806
8 Claims. (Cl. 343—16)

The invention relates to radar systems and particularly to automatic gain control (AGC) ratio circuits for use in such systems to improve the accuracy of radar angular data.

In the development of radar techniques for accurately locating target positions, it has been found that pulse to pulse variations have imposed an inherent limitation. Simultaneous lobing techniques, also called monopulse, of the general type disclosed in the U.S. patents to Phillips, Serial No. 2,682,656, issued June 29, 1954, Smith et al. 2,759, 154 issued August 4, 1956, or Budenborn 2,784,381 issued March 5, 1957, have been used to overcome this limitation of sequential, low lobing rate radars. Because of an increased demand for more accurate angular data on the positions of fast moving, small targets, a study was initiated to critically examine the available techniques of this type and to decise alternative circuit arrangements to correct for their deficiencies. This study was mainly concerned with arrangements for determining target positions within a monopulse radar beam. The electrical signal which provides a measure of the deviation (error angle $\theta$) of a target from the center of the beam is termed the electrical correction signal, usually abbreviated to ECS. The angle deviation of a target from the center of the antenna beam is customarily denoted by the error angle $\theta$. This angle $\theta$ can also be resolved into component angles in elevation and azimuth. In the following discussions, a single axis system as described through the ratio circuit is applicable equally well to a two-axis system. Desirable characteristics of ECS are that it be independent of target size, that is, area $A_{eff}$, and range, R, and be linearly proportional to the error angle $\theta$.

The potential usefulness of determining target positions within a radar beam is widely recognized, and many systems which have been developed for this purpose incorporate ECS principles. They can be divided generally into two groups, those best adapted for use with tracking radars and those best adapted for use with scanning radars with indicator presentations. Some scanning radars may include provision for tracking several targets simultaneously, i.e., track-while-scan; and such systems preferably should be considered as being included in the scanning radar group because of dynamic range consideration. Some of the systems with ECS have incorporated monitoring circuits for improving the accuracy of the output data. The above-mentioned group separation is primarily based upon the speed of response of the circuits which remove undesired amplitude fluctuation in the received signals caused by changing target position within the beam, scintillation and a change in target range.

The accuracy of angular data for a radar set using visual presentation generally need not be as great as that required from a precision tracking system. Also the rapid scan action of a scanning radar allows for some averaging of errors in reading a visual presentation. However, the greater difficulty in monitoring the gain and phase shift in the channels of a scanning set with large amplitude changes within a pulse width appears to make the track and scan problems of about equal complexity. Only systems which would lend themselves to the measurement of separate ECS in two axes, elevation and azimuth, were considered in the above-mentioned study.

The possiblity of applying monopulse techniques to a scanning radar to improve the visual presentation has received particular attention in the study. The apparent width of the antenna pattern can be reduced by using an ECS voltage to deflect each indication of target return to the correct position on the indicator. Scanning radars differ essentially from tracking radars in that the former may encounter a variety of targets within the scanning volume, whereas the latter concentrate on one target. Because of the variety of targets, the ECS circuits of a scanning radar are usually designed to function on a substantially instantaneous basis. Also, the scanning radar must utilize signals of wide dynamic range during each repetition period, so that techniques suitable for tracking radars are not adequate for use with scanning radars. With rapid scanning radars, it is necessary to minimize the scanning clutter, and one method is to use a step scan of the beam. If the beam is moved in steps of approximately a beamwidth, then the position of target within the beam is not known to closer than plus or minus a half-beamwidth unless ECS circuits are used. Depending upon the signal-to-noise ratio of the target returns, the ECS signals can position the target returns upon the scope to within a small fraction of a beamwidth.

In many radar systems, means are provided for dividing the signals received from the antenna array into reference (sum) and error (difference) signals as disclosed, for example, in the aforementioned Phillips and Budenborn patents and in the U.S. patent to Dicke, No. 2,593,120, issued April 15, 1952; and other circuitry following the antenna array is provided to accurately obtain the ratio of the difference signals to the sum signals, which is necessary to substantially eliminate the effects of range and target size from the radar error signal. A ratio circuit should have the following characteristics: (a) operate over a wide dynamic range of input signals; and (b) maintain the "sense" of the error signals. Ratio circuits may be of the instantaneous type, such as an intermediate frequency (IF) limiter, or of the "electronic divider" type the best known example of which is automatic gain control (AGC) which keeps the output of the radio receiver constant. If the AGC voltage is applied to one of two identical intermediate frequency (IF) amplifier channels respectively transmitting the difference ($\Delta$) and the sum ($\Sigma$) IF signals received from the antenna system, say, to the sum channel, and the same AGC control voltage is applied to the difference ($\Delta$) IF channel, the output of the difference ($\Delta$) IF amplifier channel will be divided by the input signals to the same channel. The ratio action can be described briefly by the following equations.

$$\Sigma \mu_{IF} \cong V_s \quad (1)$$

where $\Sigma$ = the input to the sum IF amplifier;
$\mu_{IF}$ = gain of the sum IF amplifier
$V_s$ = amplitude of the reference voltage for AGC.

The AGC voltage controls the gain of the two identical IF amplifiers. The output of the $\Delta$ IF amplifier is $$\Delta \mu_{IF} = \frac{\Delta}{\Sigma} V_s \quad (2)$$

where $\Delta$ is the input to the ($\Delta$) IF amplifier.

An analysis of this AGC ratio circuit will show that it differs from that of a linear feedback circuit in that the feedback signal, the AGC voltage, is not linearly superimposed upon the input signal; rather it multiplies the input signal. The effect of this non-linear action can be minimized by designing the IF amplifiers so that the incremental gain of each decreases with increasing signal.

A general object of the invention is to improve the angular accuracy of a radar system.

A more specific object is to improve the accuracy of the angular measurement of target positions within the radar beam in a monopulse scanning radar system.

Another object is to substantially eliminate the effects of target size and range on the error signal (ECS) in a scanning radar system.

Another object is to stabilize the ECS output of a scanning radar against systematic errors caused by changes in relative gain or phase shift of the sum and difference amplifier channels.

Other incidental objects are to compress the amplitude range of the signal received by a conventional one-channel scanning radar without lengthening the radar pulse; to adjust automatically the gain of a radar receiver to the proper range; and to monitor the gain and phase shift of the IF amplifiers in a radar system.

For accomplishing these objects, in accordance with the invention an improved AGC ratio circuit is provided for use with a scanning radar system of the type including two identical intermediate frequency (IF) amplifier channels for respectively amplifying the sum ($\Sigma$) and difference ($\Delta$) signals obtained, for example, from a monopulse antenna array through a hybrid junction, such as a "magic tee," "hybrid ring" or "retrace." This ratio circuit employs a delay line, for example, an ultrasonic delay line, having a delay time equal to the length of a pulse repetition period, in a common integrator loop for applying an AGC voltage, derived by adding the rectified output voltage of the sum ($\Sigma$) IF amplifier channel to a negative reference voltage of selected constant amplitude, $-V_s$, to the amplifiers in both the sum and difference IF channels to control their gains in accordance with the amplitude and sign of the applied AGC voltage, and thus to improve the angular accuracy of the ratio error voltage (ESC) produced in the output of the difference ($\Delta$) amplifier channel. The improved accuracy of this type of AGC ratio circuit is mainly due to the fact that it provides AGC for each target signal of a repetition period.

Also, in accordance with the invention, a modification of the delay line feedback arrangement of the above-described AGC ratio circuit is provided for monitoring the IF channels of a scanning radar and stabilizing its ECS output against systematic arrors caused by changes in relative gain or phase shift of the IF amplifiers. In this modified arrangement, the amount of gain and/or phase correction needed at each control voltage is determined by transmitting an auxiliary CW monitoring signal whose amplitude is a function of range, through each IF amplifier, selecting the amplified monitoring signal and comparing it with a fixed amplitude reference voltage in an amplitude or phase detector. The information thus obtained in the output of the detector is stored in a suitable integrating storage device, such as a closed loop circuit including a main delay line having a delay time equal to the length of one signal repetition period, an amplifier and a short video delay line in series, and is applied as a function of time through respective taps on the short video delay line to different stages of each IF amplifier to suitably adjust the gain and/or phase shift of the amplifier while maintaining stability in the circuit. A feature of this modification of the invention is the use of the short video delay line to compensate for the delay time of each IF amplifier.

The various objects and features of the invention will be better understood from the following complete description thereof when read in conjunction with the accompanying drawings in which:

FIGURE 1 is a block diagram illustrating functionally the elements which would be used in a monopulse radar to produce the ECS error signal.

FIGURE 2 shows in modified block diagrammatic form an AGC ratio circuit embodying the invention, applied to a scanning monopulse radar system;

FIGURE 3 shows schematically one type of known signal addition circuit which could be used in the AGC ratio circuit of the invention shown in FIGURE 2;

FIGURE 4 shows curves respectively indicating the transient response of the AGC ratio circuit of FIGURE 2 for applied signals of different levels;

FIGURE 5 shows in simplified diagrammatic block form a modification of the delay line feedback ararngement of the AGC ratio circuit of FIGURE 2 in accordance with the invention, adapted for monitoring the IF amplifier channels and for automatically adjusting the characteristics of the amplifiers therein so as to provide greater accuracy of the output data with variations in gain and phase shift of these channels; and FIGURE 6 is a diagram showing the voltage output of the sum channel detector in the ratio circuit of FIGURE 2 for a number of target signals present simultaneously.

As shown in the functional diagram of FIGURE 1, a monopulse scanning radar should include means in the monopulse antenna system MA for deriving reference sum signals ($\Sigma$) and error difference ($\Delta$) from the pulse energy reflected from targets within the transmitted monopulse radar beam, received in the radar receiving circuits during each pulse repetition period, and following circuitry RC for obtaining accurately the ratio of the difference to the sum signals $$\left(\frac{\Delta}{\Sigma}=\mathrm{ECS}\right)$$

Referring to the block diagram of FIGURE 2, one embodiment of the AGC ratio circuit in accordance with the invention adapted for use with a monopulse scanning radar includes two intermediate frequency (IF) transmission channels CA and CB each having an identical variable gain amplifier VA1 and VA2, for respectively amplifying the sum ($\Sigma$) signals and the difference ($\Delta$) signals received from the receiving monopulse antenna array of the system during operation, for example, through conventional hybrid junctions or "magic-tee" waveguide coupling networks. The sum ($\Sigma$) signal is the summation of the signals obtained from the full antenna aperture of MA and is used for radar range measurements and as a signal reference. The difference or delta ($\Delta$) signal is the error signal and is made up of vertical and horizontal error components.

The output of the sum ($\Sigma$) IF amplifier VA1 in channel CA is connected through a suitable device D, such as a linear detector for rectifying and converting the amplified signals to video pulses, to one of two conjugate inputs of a conventional signal addition circuit AC1; and a source of reference voltage of a selected constant negative value, $-V_s$, is connected to the other input of that signal addition circuit. The single output of AC1 is connected to the amplifiers VA1 and VA2 in channels CA and CB, respectively, through the integrating closed loop circuit IL1 including as shown, a second addition circuit AC2 identical with AC1, and a delay line DL1 in series, one input of the second addition circuit AC2 being connected directly to the output of the first addition circuit AC1, the output of AC2 being connected to the input of delay line DL1 and the output of DL1 back to the second input conjugate to the first input of the signal addition circuit AC2 as well as to the gain control element of amplifier VA1 and VA2, as shown.

The addition circuits AC1 and AC2 in the system of FIGURE 2 may be of any suitable type. For example, because the output of the sum IF channel is rectified and converted to video pulses before the first signal addition step, and the reference signal, $-V_s$ is, in general DC or varying at the signal repetition rate of the radar system, a simple resistor type of addition circuit, such as illustrated in FIGURE 3, may be employed for each circuit AC1 and AC2. As shown, it includes three individual resistors $R^1$, $R_2$ and $R_3$ each having one end connected to a common point P. The other end of the resistor $R_1$ is connected to one input terminal A, the other end of the resistor $R_2$ to a second input terminal B of the circuit, and the other end of the third resistor $R_3$ to ground. An output terminal C is connected to the common point P. As indicated in FIGURE 3, in the case of the signal addition circuit AC1, the rectified IF output voltage, $V_\Sigma$ of the sum channel CA in the system of FIGURE 2, would be supplied to the input terminal A of that circuit and the reference voltage, $-V_s$ to the second input terminal B. By making $R_1 \gg R_3$ and $R_2 \gg R_3$, the applied input voltage, $V_\Sigma$, is effectively isolated from the applied reference voltage $-V_s$, and the sum of these two voltages, $V_\Sigma - V_s$, will appear at the output terminal C. Alternatively, isolation amplifiers could be used for this purpose.

The delay line DL1, which is preferably of the quartz ultrasonic type, has a total delay time equal to the length ($\tau$) of one pulse repetition period of the scanning radar system. The delay line DL1 of this type is a wideband delay device with a bandwidth somewhat greater than that of the IF amplifiers VA1 and VA2. Since practical ultrasonic delay lines will not pass video signals directly it is necessary to modulate the video output of the addition circuit AC2 upon a suitable carrier signal before introducing it into the delay line DL1. This carrier signal can vary widely in frequency but might lie between 10 and 75 megacycles in typical designs. The output of DL1 must then be demodulated (rectified) before it is fed back to the second input of AC2 and to the IF amplifiers VA1 and VA2 in channels CA and CB, respectively. For these purposes, as shown in FIGURE 2, a suitable conventional modulator MD having a carrier of frequency between 10 and 75 megacycles supplied to its carrier input terminals, is inserted between the output of AC2 and the input of delay line DL1, and a conventional demodulator DM, such as a detector, is inserted in the output of DL1. Ultrasonic delay lines having a wide range of delay times (inverse of repetition period) are available in the market. One having approximately 200 microseconds delay might be used for a short range radar and one having approximately 3000 microseconds delay for a long range radar.

The definition of each of the mathematical and other symbols used in connection with the following description of operation of the AGC ratio circuit of FIGURE 2, including those previously defined, is given in the following table.

*Definitions of mathematical and other symbols used*

$A_{Eff}$ = effective target area.
R = range of target.
W = IF amplifier bandwidth.
$\theta$ = error angle measuring deviation from the antenna axis.
$V_s$ = D.C. reference voltage used in AGC feedback loop.
K = component of a target signal not varying with time.
$k_2$ = slope at operating point of curve defining relationship between IF gain and the AGC control voltage.
$\Sigma$ = summation voltage from monopulse antenna, customarily a function of the error angle $\theta$ (input to IF amplifier VA1).
$\Delta$ = difference signal voltage from the monopulse antenna, customarily a function of the error angle $\theta$ (input to IF amplifier VA2).
$f_i(t)$ = step change in a target signal occurring at zero time.
$\delta$ = open loop voltage gain of integrator circuit IL1.
q = number of repetition periods measured from zero time.
$\tau$ = length of repetition period and of delay line DL1 in seconds.
$V_\Sigma$ = amplitude of output voltage of sum channel CA.
ECS = a signal independent of target size and range and linearly proportional to the target error angle, $\theta$.

For each summation voltage representing a range element applied to the input of the sum IF amplifier VA1 in channel CA during each pulse repetition period, the amplified and rectified output voltage $V_\Sigma$ of that amplifier will be applied to one input of the first signal addition circuit AC1 in which it will be added to the fixed amplitude negative reference voltage, $-V_s$, applied to the other input of that circuit to produce the voltage, $V_\Sigma - V_s$, in the output circuit of AC1. This output voltage will be impressed on one input of the second signal addition circuit AC2 in the integrating loop circuit IL1 and, the second input of the latter circuit, not being effective at that time, will appear in the output of AC2. This voltage is modulated in the modulator MD with a carrier signal (of frequency between 10 and 75 megacycles) and the resulting modulated carrier after being transmitted through the delay line DL1 in which it will be subjected to a time delay equal to the length of one repetition period will be demodulated in the demodulator DM. A portion of the demodulated signal will be fed regeneratively to the second input of the addition circuit AC2 in the integrating loop IL1, and will be added in that circuit to the voltage then appearing in the output of the first addition circuit AC1 in the same repetition period. The added voltages with a delay equal to the time delay of delay line DL1 in their path, will appear in the output of the demodulator DM and will be applied degeneratively as correction voltages of the proper value and sign to adjust the gain of the two intermediate amplifiers VA1 and VA2, accordingly. This will result in increased accuracy of the ratio $\Delta/\Sigma V_s$ appearing in the output of the IF amplifier VA2 in the difference IF amplifier channel CB. The improvement in accuracy is explained by the fact that the ultrasonic delay line DL1 in the integrator loop IL1 effectively provides AGC for each range element of a repetition period. The action during each range element is the same as described by Equations 1 and 2 above.

The following expression for the ratio output obtained by an analysis of the AGS ratio circuit shows the importance of the integrator action in improving the accuracy of the ECS signal while maintaining stability in the circuit.

Ratio output =

$$k_2 \frac{\Delta}{\Sigma} V_s \delta [K + f_i(t)] \left[ \frac{1 - \delta^q(1 - k_2[K - f_i(t)])^q}{1 - \delta(1 - k_2[K - f_i(t)])} + \frac{\delta^q(1 - k_2[K - f_i(t)])^q}{1 - \delta(1 - k_2 K)} \right]$$
(3)

As is customary for the solution of a difference equation, the result, Equation 3, applies only for time intervals of length $\tau$ corresponding to particular values of $q$. From (3) for $q=0$, $$\text{Ratio output} = V_s \frac{\Delta}{\Sigma} \left[ 1 + \frac{f_i(t)}{K} \right] \text{ for } 0 < t < \tau \quad (4)$$

Equation 4 shows that there is no correction of the error in the ratio during the first repetition period. This is the expected result since no correction can reach the IF amplifiers until the delay period of the delay line DL1 elapses. By inspection, it is apparent that the quantities which are raised by the power $q$ must be less than one if the output is to be finite as $q$ approaches a large integer, or $$|\delta(1 - k_2[K - f_i(t)])| < 1 \quad (5)$$

The above inequality equation can also be expressed in a slightly different arrangement;

$$1 + \frac{1}{\delta} > k_2[K - f_i(t)] > 1 - \frac{1}{\delta} \quad (6)$$

If the integrator loop IL1 is to be stable, then $\delta$ must be less than one, although it is desirable for $\delta$ to approach one for ratio action, so $$k_2[K - f_i(t)] \gg \frac{1}{\delta} - 1 \quad (7)$$

and for $\delta \to 1$, for stability $$2 > k_2[K - f_i(t)] > 0 \quad (8)$$

If the two inequalities (7) and (8) are satisfied, then as $q$ becomes large the ratio output reduces to $$\text{Ratio output} \cong k_3 V_\text{s} \cong \frac{\Delta}{\Sigma} V_\text{s} \qquad (9)$$

the desired result.

The curves of FIGURE 4 may be explained as follows. By taking an example wherein a constant amplitude signal K is perturbed by a small step change of amplitude $f_1(t)$, the ability of the ratio circuit of FIGURE 2 to follow changes in the signal amplitude such as might occur during step scanning of the antenna pattern can be determined. While the explanation used here involves a small step change in signal level through appropriate mathematical operations the response to any type antenna pattern and scanning action can be determined. Since a step change in the signal represents a difficult condition for the ratio circuit operation, it is used as an example. The signals shown in the example of FIGURE 4 are drawn as though the pulse length of the radar is very long and equal to the interpulse time interval $\tau$, and usually the pulse length of the radar is very much shorter than $\tau$. The use of a shorter pulse would have allowed two or more target signals to be used in the example, as illustrated in FIGURE 6 to be described later, and thus be more realistic.

The transient response of the AGC ratio circuit will depend upon the product $k_2K$, and depending on the value of this product can be as shown in any one of the curves (A), (B), or (C) of FIGURE 4, respectively showing an oscillatory output for large signals; a critically damped output for a medium signal; and overdamped output for a small signal. The output shown in FIGURE 4(A) is oscillatory for a product $k_2K$ of between 1 and 2. If the product $k_2K$ is exactly 1, then a very significant result is obtained. The fedback loop adjusts the gain to the correct value within one signal pulse after a change of input signal, which is a very desirable condition since the response time of the loop is reduced to a minimum. For a product $k_2K$ of between zero and one, the response in an underdamped one and slowly approaches the correct value.

The results of this analysis have shown that the delay line AGC ratio circuit of FIGURE 2 can give a very desirable type of response in that through a correct adjustment of the product $k_2K$, the loop can completely correct for errors and give the desired ratio output within one signal pulse after a change has occurred in the input signal. This type of response can be obtained simultaneously for all targets within the beam of the radar. The ability of a radar to resolve targets in range is customarily limited by the pulse length of the radar. The IF bandwidth W is adjusted to the commensurate with the radar pulse length. The product of W and the radar pulse length is customarily within the range 1 to 2. Thus, the number of targets which can be resolved in the interval $\tau$ between transmitter pulse is approximated by the product $\tau W$ (this is equivalent to dividing the repetition interval $\tau$ by radar pulse length). A number of targets up to the limit $\tau W$ can be handled simultaneously within the radar beam. Thus, the delay line AGC ratio circuit of FIGURE 2 is capable of handling simultaneously a large number of targets (up to the number $\tau W$) with each target giving a ratio output which is modified to the proper value, ECS, within approximately one interval $\tau$, whenever there is a change in the input signal for any target.

FIGURE 6 shows the variation of $V_\Sigma$ output of the sum channel detector D of FIGURE 2 with time for three target signals present simultaneously, the subscript number on $V_\Sigma$ being used to identify the different targets. A sudden change in $V_{\Sigma 1}$ during the time interval $q=0$ is corrected by one interval $\tau$ later.

The above analysis and discussion have brought out the desirability of maintaining the product of $k_2K$ at approximately the value one so as to obtain the most desirable type of transient response. Since K is a function of the input signal, the quantity $k_2K$ will not be a constant unless $k_2$ also varies as a function of the input signal K. As has been previously pointed out the effect of the non-linear action (variation of K on the product $k_2K$) can be minimized by designing the IF amplifier so that the incremental gain $k_2$ decreases with increasing signal level K, to maintain the product $k_2K$ approximately constant. If variable $\mu$ amplifier tubes are used in the IF amplifier, the desired variation of $k_2$ with the amplitude of the control signal will occur.

The AGC delay line ratio circuit as above described will give more accurate results than the instantaneous type of ratio circuit, such as a limiter, in the presence of internal noise in the IF amplifier channel, which would be thermal noise and differ in the two channels, as it averages the $\Sigma$ channel signal before computing the ratio. Among the other advantages which can be obtained with this ratio circuit when used with a scanning radar circuit are that it may compress the amplitude range of the signals received by a conventional one channel scanning radar without lengthening the pulse, such as occurs in a logarithmic or limiting type receiver. Also, the gain of the receiver is automatically adjusted to the proper operating range. This is very desirable in an unattended radar, such as a map-matching radar in a guided missile or defense net. The use of a quartz delay line and subminiature electron discharge tubes also should enable the delay line integrator above described to be built so as to occupy a very small space. Other types of delay advices, such as a barrier grid storage tube designed to provide the proper amount of delay, may be used to replace the delay line integrator.

To get accurate ECS data, the signals in a scanning radar system must not be distorted in phase and/or amplitude. It is the IF amplifier with its great gain that large systematic errors may occur. To counteract this, some method must be employed to monitor the circuits and to effectively reduce the dynamic range. Conventional AGC techniques are of little value because the time lag in the IF amplifier prevents rapid changes in gain with input signal level. Possible complementing methods of controlling the amplifiers to accommodate signals of a wide dynamic range including the use of a sensitivity time control to adjust the gain of all amplifier channels as a function of radar range, and the use of a sensitivity time control voltage on the amplifier channels which will compensate for changes, systematic errors, in the relative gain and phase shift of the several channels. A modification of the delay line feedback arrangement in the AGC ratio control circuit of FIGURE 2, in accordance with the invention, which can be used to monitor the gain or phase shift of the IF amplifiers in a scanning radar system with the aid of an auxiliary CW monitoring signal in each amplifier channel, is illustrated in FIGURE 5.

Referring to FIGURE 5, an auxiliary CW monitoring signal whose amplitude is a function of radar range is applied to the input of the amplifier VA3 in each IF amplifier channel along with the regular IF signal. The amplified regular IF signals are transmitted to the regular detector circuits (not shown) of the scanning radar system which will apply them to data storage arrangements in well known manner. The amplified monitoring signal will be selected from the output of the amplifier VA3 by a filter F1 of suitable pass band and will be applied to one input of a conventional amplitude detector AD, such as a difference amplifier, or a conventional phase detector PD, in which it will be compared with a reference signal of predetermined constant amplitude applied to another input thereof, and will produce in the output of the detector a difference voltage which by its amplitude and sign gives information on the necessary gain (or phase) correction, respectively, required in the amplifier VA3 to compensate for the relative gain and/or phase shift of the IF channel. This calibration information is stored in a suitable storage and integrating device SD, which can be a delay line, magnetic drum storage unit, storage tube, etc., and will be applied as a function of time to the gain or phase control elements of the amplifier VA3 to produce proportional corrections therein. The particular integrating and storage device SD illustrated is a closed electrical loop circuit IL2 consisting of a main delay line DL2, a fixed gain amplifier FA and a short video delay line DL3 connected in series. The main delay line DL2, which may be of the quartz ultrasonic type, is made such as to provide a delay time in the calibrating signal applied thereto from the output of the detector AD or PD, equal to the length of one pulse repetition period of the scanning radar system, or integral multiples thereof; and the amplifier FA would be adjusted to provide the necessary gain in this circuit of the delayed signal required to provide correction of the proper amount to the IF amplifier (VA3). Since a feedback signal, applied after a delay of one repetition period, may result in oscillation if the gain of the loop IL2 exceeds unity, a method of averaging the feedback signal with delays which are multiples of a repetition period has been provided in this feedback arrangement.

The short video delay line DL3 is provided in the loop circuit IL3 to compensate for the delay produced in the IF amplifier VA3. If more than one stage of the amplifier VA3 is to be gain-controlled, taps would be used on the short delay line DL3, as indicated, to enable differently delayed portions of the correction voltage to be applied to respective stages of the amplifier VA3, such as to allow each stage to receive the proper correcting control voltages at the instant of the arrival of a particular repetitive signal at that amplifier stage. By operating with signals which change only a few decibels each repetition period, the problems encountered in the use of instantaneous AGC, referred to above, are avoided. However, enough hits (received target signals) per beamwidth of the transmitted radar beam must be available at the radar receiver to allow the circuits to approach steady state when used with a scanning radar.

If the circuit of FIGURE 5 is used for gain control of the IF amplifier of a scanning radar, its output variations can be reduced by any suitable means to prevent overload of the IF amplifier or the following indicator device.

For phase shift monitoring of the IF amplifier, the usual amplitude detector AD would be replaced with any suitable phase detector PD having two conjugate inputs and a single output, and a conventional reactance tube phase shifter (not shown) would be inserted in the control for the amplifier VA3 to provide the required phase shift control of the latter proportional to the detected difference in phase between the amplified monitoring signal applied through filter F1 to one input of the phase detector and the reference signal applied to its other conjugately connected input.

Various other modifications of the circuit which have been illustrated in the various figures of the drawing and described above which are within the spirit and scope of the invention will occur to persons skilled in the art.

What is claimed is:

1. In combination with a scanning radar of the monopulse type including an antenna system for periodically radiating electromagnetic pulse energy in the form of a directional beam at a given pulse repetition rate and for picking up pulse echoes reflected from targets within said beam on which the radiated pulse energy impinges, and associated means for deriving reference sum and error difference intermediate frequency signals from each echo pulse received during each pulse repetition period: an automatic gain control ratio circuit for obtaining in response to each received echo pulse an electrical correction signal which is accurately proportional to the ratio of the difference to the sum intermediate frequncy signals derived from that pulse and provides a measure of the position, including both range and angle with respect to the center axis of the radiated beam, of the target producing that echo pulse, with respect to the antenna system, said ratio circuit comprising two transmission channels each including a substantially identical variable gain amplifier, for respectively amplifying each set of derived sum and difference intermediate frequency signals; means for rectifying the amplified voltage output of the sum intermediate frequency amplifier channel; a source of negative reference voltage of predetermined constant value; a signal addition circuit for adding the rectified voltage output of the sum amplifier channel to the reference voltage from said source to produce an automatic gain control voltage of amplitude proportional to the sum of the added voltages; an integrating loop circuit for applying each produced automatic gain control voltage degeneratively to the amplifiers in both said channels to adjust their gains in accordance with the amplitude of the applied voltage, said loop circut including means for improving the accuracy of the ratio error signal appearing in the output of said difference amplifier channel, comprising a delay line in the path of the feedback automatic gain control voltage, having a total delay time equal to the length of a pulse repetition period.

2. The combination of claim 1, in which said delay line has a total delay time equal to the length of one pulse repetition period of the antenna system and improves the accuracy of the ratio error signal by causing each produced automatic gain control voltage to act on all echo pulses received during each pulse repetition period.

3. The combination of claim 1, in which the integrating loop circuit of the automatic gain control ratio circuit includes a second signal addition circuit fed from the output of the first signal addition circuit and feeding said delay line, which operates in combination with the other elements including said delay line, of said loop circuit to provide regenerative feedback therein to produce automatic gain control voltages of suitable value for properly adjusting the gains of the amplifiers in said transmission channels.

4. The combination of claim 1, in which said integrating loop circuit includes a second signal addition circuit having one input fed from the output of the first signal addition circuit, a second input conjugately connected with respect to the first input of said second addition circuit and a single output connected through said delay line to said second input of that circuit; said delay line is a wide-band delay device having a bandwidth greater than that of each of said variable gain IF amplifiers; to enable said delay line to pass the video output of said second addition circuit, that video output is modulated upon a high frequency carrier signal before the signal is introduced into the input of the delay line, and the video signal is demodulated from the modulated carrier signal in the output of said delay line before it is fed back regeneratively to the said second input of said second addition circuit, the fed-back video signal being added in said second addition circuit to the voltage applied to said one input thereof to produce in the single output of that circuit the automatic gain control voltages which are applied degeneratively to said intermediate frequency amplifiers to adjust their gains in accordance with the sign and amplitude of these voltages.

5. In combination with a scanning radar system including antenna means for radiating electromagnetic pulse energy in the form of a beam, at a given pulse repetition rate, and for picking up echo pulses reflected from targets within said beam on which the radiated pulses impinge, and respectively carrying information on the position, including range and angle with respect to the center axis of the radiated beam, of the target causing the echo with respect to said antenna means, means for deriving signals of intermediate frequency from each received echo pulse, one or more transmission channels each including a substantially identical variable gain amplifier with one or more stages, for respectively amplifying certain components of the intermediate frequency signals derived from each echo pulse received by said antenna means during each pulse repetition period: apparatus for monitoring the gain of the amplifier in each said channel and for stabilizing the electrical correction signal output of the radar system against errors caused by systematic changes in relative transmission characteristics of the amplifiers in the several channels, comprising means for applying a CW monitoring signal the amplitude of which is a function of range, to the input of said channel; filtering means for selecting the amplified monitoring signal from the output of the amplifier in each channel, a source of reference voltage of constant predetermined value, a detector for comparing the voltage of the selected monitoring signal with said constant reference voltage and producing in the output of the detector a correction difference voltage providing information on the amount of transmission characteristics correction needed in the amplifiers of the associated channels; and a storage device with incorporated integrating means, fed from the output of said detector for storing the applied correction signals for a given interval of time and for applying them as a function of time degeneratively to the amplifiers in said channels to provide the necessary adjustment in their transmission characteristics to stabilize the radar electrical correction signal output.

6. The combination of claim 5, in which said storage device comprises a closed integrating loop circuit connected between the output of said detector and the channel amplifier, including a main delay line, a fixed gain amplifier and a short video delay line in series, the total delay time of the main delay line being equal to the length of one pulse repetition period, the total delay time of said short video delay line being selected such as to compensate for the time delay in the channel amplifiers, and the gain of said fixed gain amplifier being selected such as to provide the required amount of degenerative feedback in said loop circuit to compensate for the distortion introduced by the channel amplifier.

7. The system of claim 5, in which the integrating storage device comprises a closed electrical loop circuit connected between the output of said detector and the channel amplifiers, said loop circuit comprising a main delay line, a fixed-gain amplifier and a short video delay line in series, said main delay line having a total delay time equal to the length of one pulse repetition period, the short video delay line having a total delay time selected such that it compensates for the delay in the channel amplifiers and including means for applying the delayed voltages produced at a certain point therein as control voltages to said channel amplifiers to provide the necessary adjustments in the transmission characteristics thereof.

8. The system of claim 5, in which each channel amplifier comprises a plurality of amplifier stages, said loop circuit comprises a main delay line, a fixed gain amplifier and a short video delay line in series, said main delay line having a total delay time equal to the length of one pulse repetition period, said short video delay line having a total delay time such that it effectively compensates for the delay time in each channel amplifier, and includes taps at suitable different points therealong for establishing different delayed portions of the total control voltage which are respectively applied to different ones of the stages of each channel amplifier and are such as to allow the respective stages to receive the tapped-off control voltage at the instant of arrival thereat over the associated channel of the intermediate frequency signal components derived from a particular repetitive echo pulse.

References Cited by the Examiner
UNITED STATES PATENTS

| | | | |
|---|---|---|---|
| 2,487,995 | 11/1949 | Tucker | 343—5.1 |
| 2,552,527 | 5/1951 | Dean et al. | 343—5.1 |
| 2,682,656 | 6/1954 | Phillips | 343—16.1 |

CHESTER L. JUSTUS, *Primary Examiner.*

G. J. MOSSINGHOFF, R. D. BENNETT,
*Assistant Examiners.*